E. GRUENFELDT.
RUNNING GEAR CONSTRUCTION.
APPLICATION FILED DEC. 28, 1909.
960,897. Patented June 7, 1910.
2 SHEETS—SHEET 1.
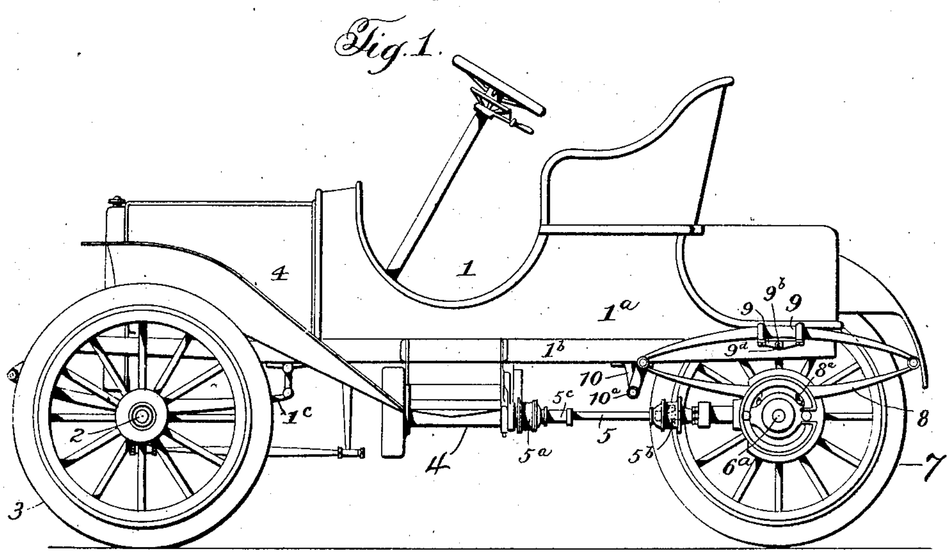
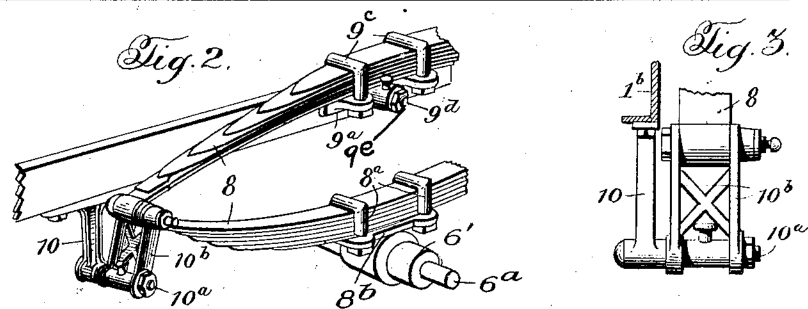
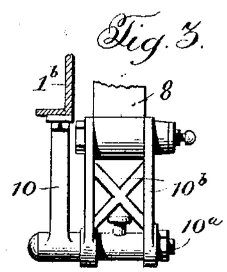
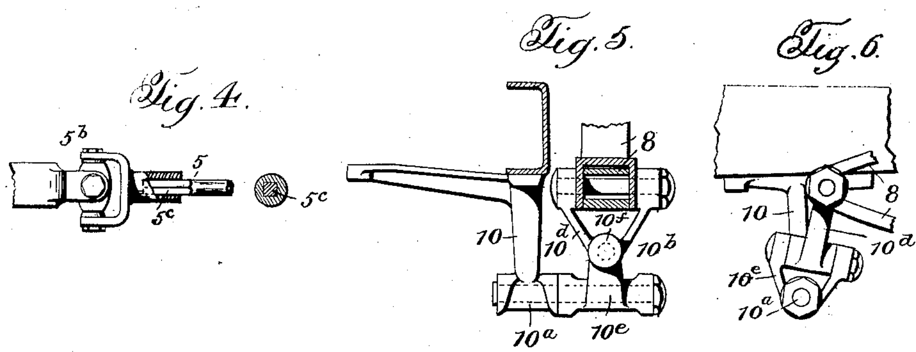
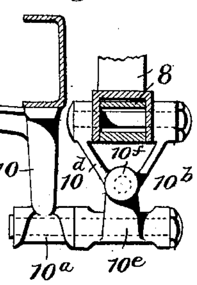
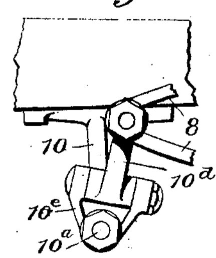
Witnesses:
Jas. E. Hutchinson
Geo. B. Pitts
Inventor:
Emil Gruenfeldt,
By Edmund R. Alexander
Attorney:

E. GRUENFELDT.
RUNNING GEAR CONSTRUCTION.
APPLICATION FILED DEC. 28, 1909.
960,897. Patented June 7, 1910.
2 SHEETS—SHEET 2.
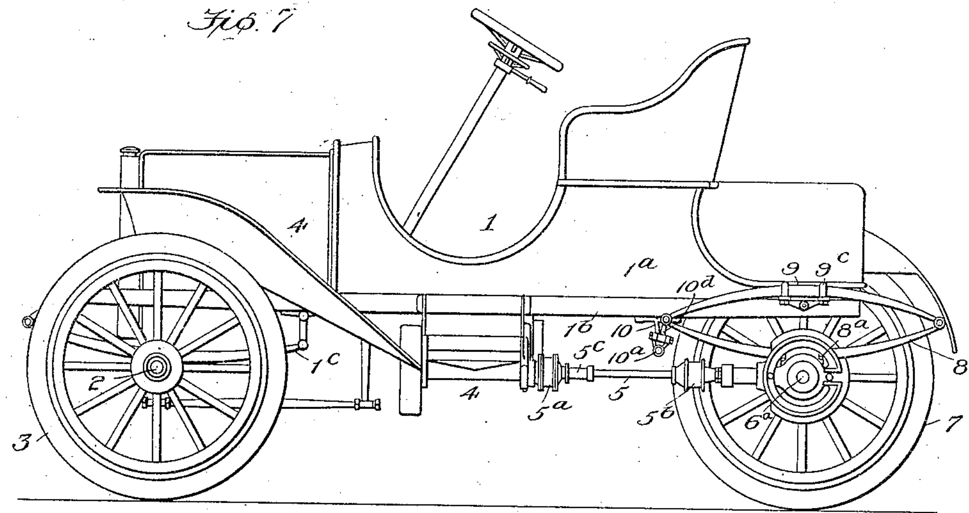
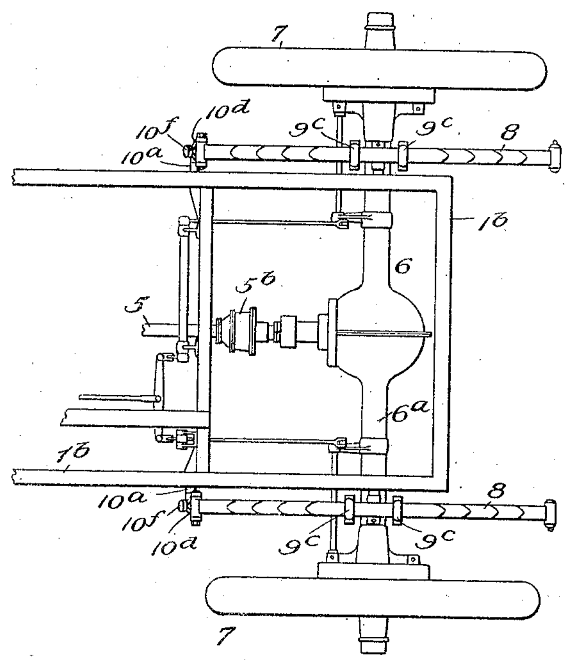
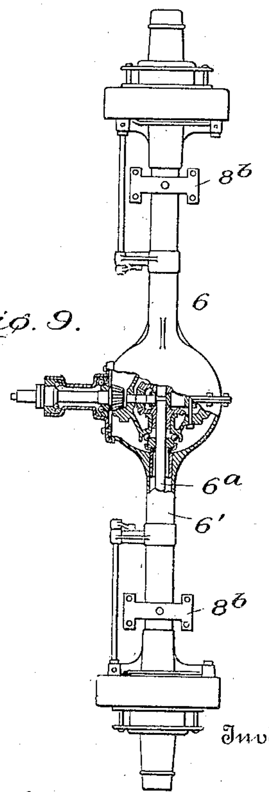
Witnesses
C. C. Wright
J. S. Barker
Inventor
Emil Gruenfeldt
By Edward R. Alexander
Attorney

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

RUNNING-GEAR CONSTRUCTION.

960,897. Specification of Letters Patent. Patented June 7, 1910.

Application filed December 28, 1909. Serial No. 535,229.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Running-Gear Construction, of which the following is a specification.

This invention relates to running gear mechanism for motor or self-propelled vehicles.

For the purpose of illustration, I have in the accompanying drawings shown, and herein described, one form of running gear mechanism embodying my invention.

Figure 1 is a side elevation of an automobile embodying my invention, one rear wheel being removed. Figs. 2 and 3 are views illustrating details of construction, somewhat enlarged. Fig. 4 is a view partly in side elevation and partly in section of one of the universal joints. Figs. 5 and 6 are views illustrating modifications of certain of the parts shown in Figs. 2 and 3. Fig. 7 is a side elevation of an automobile, showing the modification of the invention applied thereto. Fig. 8 is a plan view of the rear of the automobile, the body of the vehicle being removed. Fig. 9 is a plan view of the axle, parts being broken away.

In the drawings, 1 indicates a self-propelled or motor vehicle comprising a car body $1^a$, frame $1^b$, front springs $1^c$, front axle 2, front wheels 3, an engine or motor 4 suitably geared to a drive or propeller shaft 5, which in turn is suitably geared to a rear axle 6. This rear axle 6 may be of any well known construction. In the drawings 6′ indicates the housing and $6^a$ one of the shaft or live axle sections mounted in the housing. 7 indicates a rear drive wheel which is secured to the other of the driven shaft or live axle sections $6^a$ (not shown).

The drive or propeller shaft 5 in the embodiment illustrated, as an entirety, includes two universal joints $5^a$, $5^b$ and a longitudinally slidable connection $5^c$.

The parts just described may be of any general or special construction, as desired, and form no part of my invention.

8 indicates a spring or springs for the vehicle. Preferably they are full elliptic in form and interposed between the axle housing 6′ and the frame $1^b$, one at either side of said frame, only one of said springs being shown. The lower half of each spring is rigidly secured, as by a bolt or clip $8^a$, to a spring seat $8^b$, which in turn is rigidly secured or formed integral with the rear axle housing 6′ in any well known manner.

9 indicates means for pivotally securing the upper half of the spring 8 to the vehicle body $1^a$. These means preferably comprise a plate $9^a$ having an aperture $9^b$ and fixed to the said spring by straps $9^c$, $9^c$, and a pin or stud shaft $9^d$ carried by and extending laterally from the frame $1^b$ and arranged to extend into the said aperture $9^b$. The aperture $9^b$ may be provided with suitable bearings for the shaft $9^d$, and the latter may at its outer end be screw threaded to receive a nut $9^e$, to maintain the plate $9^a$ in proper position.

In carrying out the purpose and object of my invention I pivotally connect one end of each spring 8, preferably the front end thereof, to the frame $1^b$. These connections preferably comprise a bracket or arm 10 fixed to the body $1^a$ and carrying a laterally extending shaft $10^a$, which is arranged parallel to the rear axle 6, and a link member $10^b$ swingably mounted at one end upon the shaft $10^a$ and pivotally connected at its opposite end to the front end of the adjacent spring 8.

In the modification shown in Figs. 4 and 5, the link member $10^b$ is constructed of two parts $10^d$, $10^e$, each formed with apertures to receive a pivot pin $10^f$, the axis of which is at right angles to the shaft $10^a$. It will be understood that this construction forms what may be termed a universal joint or connection between the front end of the spring 8 and the frame $1^b$, whereby the latter may move vertically bodily and to simultaneously oscillate or rock on axes longitudinal of the body without affecting the operation of these connections.

I am aware of the fact that it has been heretofore proposed to pivot the upper half of a full elliptic spring to a vehicle frame, the lower half being secured to a driving axle, and to connect the front end of the spring by an adjustable strut to the frame, for chain adjusting purposes, for example, as illustrated in Letters Patent of the United States No. 750,867 to T. J. Lindsay, dated February 2nd, 1904. However, such a construction as the said patented one just referred to will not accomplish the same results as are obtainable with my invention, wherein the connections between the frame, rear axle and full elliptic spring are such that the spring serves in addition to its functions which are essentially characteristic of full elliptic springs the additional functions both of a radius and a torsion rod. Acting as a radius rod, it tends to prevent and absorb or correct any tendency of the rear axle to increase the distance between it and the axis of the stud $10^a$. Acting as a torsion rod, it tends to prevent and absorb or correct any tendency of the rear axle housing to turn bodily, clockwise or anti-clockwise, about the axis of the shaft section $6^a$, due to any shock, strain or impulse transmitted from the propeller shaft 5 or otherwise to the rear axle.

What I claim is:—

1. In a device of the character described, the combination with a self-propelled vehicle comprising a frame, a front axle, a rear live axle, and a motor driven shaft for driving the live axle sections of said rear axle and journaled in the housing of said rear axle, of full elliptic springs, one at either side of the frame, interposed between the said live axle housing and the said frame, each of said springs having its lower half rigidly secured to the live axle housing, means for pivotally connecting the upper half of each spring to the frame, and links, each pivotally connected at its upper end to the front end of the adjacent spring, and at its lower end having a pivotal connection with said frame.

2. In a device of the character described, the combination in a motor vehicle having a frame, a motor thereon, a front axle, a rear live axle and a propeller shaft arranged longitudinally of said frame and geared at its front end to said motor and at its rear end to said rear live axle, said propeller shaft being journaled in the housing thereof, of full elliptic springs, one at either side of said frame, each of said springs having its lower half rigidly connected to the rear axle housing, means pivotally connecting the upper half of each spring to the frame, and links, each pivotally connected at its upper end to the front end of the adjacent spring and at its lower end having pivotal connection with said frame on an axis at right angles to the axis of the propeller shaft and thereabove.

3. In a device of the character described, the combination with a self-propelled vehicle comprising a frame, a front axle, a rear live axle, and a motor driven shaft for driving the live axle sections of said rear axle and journaled in the housing of said rear axle, of full elliptic springs, one at either side of the frame, interposed between the said live axle housing and the said frame, each of said springs having its lower half rigidly secured to the live axle housing, means for pivotally connecting the upper half of each spring to the frame, and links, each pivotally connected at its upper end to the front end of the adjacent spring, and at its lower end having universal pivotal connection with said frame.

4. In a device of the character described, the combination in a motor vehicle having a frame, a motor thereon, a front axle, a rear live axle and a propeller shaft comprising telescoping members and arranged longitudinally of said frame and geared at its front end to said motor and at its rear end to said rear axle, said propeller shaft being journaled in the rear axle housing, of full elliptic springs, one at either side of said frame, each of said springs having its lower half rigidly connected to the rear axle housing, means pivotally connecting the upper half of each spring to the frame, and links, each pivotally connected at its upper end to the front end of the adjacent spring and at its lower end having pivotal connection with said frame on an axis at right angles to the axis of the propeller shaft and thereabove.

In testimony whereof I affix my signature, in the presence of two witnesses.

EMIL GRUENFELDT.

Witnesses:
EDWARD R. ALEXANDER,
GEO. B. PITTS.